United States Patent [19]

Torres

[11] Patent Number: 5,317,687
[45] Date of Patent: May 31, 1994

[54] METHOD OF REPRESENTING A SET OF COMPUTER MENU SELECTIONS IN A SINGLE GRAPHICAL METAPHOR

[75] Inventor: Robert J. Torres, Colleyville, Tex.

[73] Assignee: International Business Machines Corporation, Armonk, N.Y.

[21] Appl. No.: 146,821

[22] Filed: Nov. 2, 1993

Related U.S. Application Data

[63] Continuation of Ser. No. 783,641, Oct. 28, 1991, abandoned.

[51] Int. Cl.⁵ .............................................. G06F 15/62
[52] U.S. Cl. .................................... 395/159; 395/156; 345/146
[58] Field of Search .......................... 395/156, 159, 160; 345/145, 146

[56] References Cited

U.S. PATENT DOCUMENTS

| | | | |
|---|---|---|---|
| 4,984,152 | 1/1991 | Muller | 395/159 |
| 5,079,723 | 1/1992 | Hercey et al. | 395/156 |
| 5,140,677 | 8/1992 | Fleming et al. | 395/157 |
| 5,148,155 | 9/1992 | Martin et al. | 340/712 |
| 5,220,675 | 6/1993 | Padawer et al. | 395/156 |

OTHER PUBLICATIONS

Henry et al., "Multidimensional Irons", ACM Transactions on Graphics, vol. 9 No. 1 (Jan. 1990), pp. 133–137.
"Iron Grouping Allowing Common and Individual Iron Interaction", Research Disclosure 315042, Kenneth Mason Publications Ltd. (Jul. 1990), Abstract Only.
"Overlapped Selection Irons", Research Disclosure 29734, Kenneth Mason Publications Ltd. (Jan. 1989), pp. 26.
"Virtual Office Desktop Drawers", Research Disclosure 30531, Kenneth Mason Publications Ltd. (Sep. 1989), pp. 651.
Murphy, "41 Utilities for Windows 3.0: Program Management Utilities", PC Magazine, vol. 10 No. 4 (Feb. 26, 1991), pp. 137–145 (Abstract Only).
"Microsoft Windows User's Guide for the Windows Graphical Environment Version 3.0", Microsoft Corporation (1990), pp. 41–56 and 79–98.

Primary Examiner—Heather R. Herndon
Assistant Examiner—N. Kenneth Burraston
Attorney, Agent, or Firm—Jonathan E. Jobe; Paul W. O'Malley; Andrew J. Dillon

[57] ABSTRACT

A data processing system includes an operating system, a graphical user interface and a plurality of applications programs. The graphical user interface generates a window relating to an executing application programs. Menu items relating to an application program may be represented by an icon. A selected group of objects is defined over a portion of the menu and represented by a metaphor. The graphic metaphor, here an icon ring is displayed on a display device. The icon ring is evocative of an ordered arrangement of items of the selected group, includes the icon for a particular object open to selection, and is subject to direct manipulation for reordering of the underlying selected group.

8 Claims, 7 Drawing Sheets

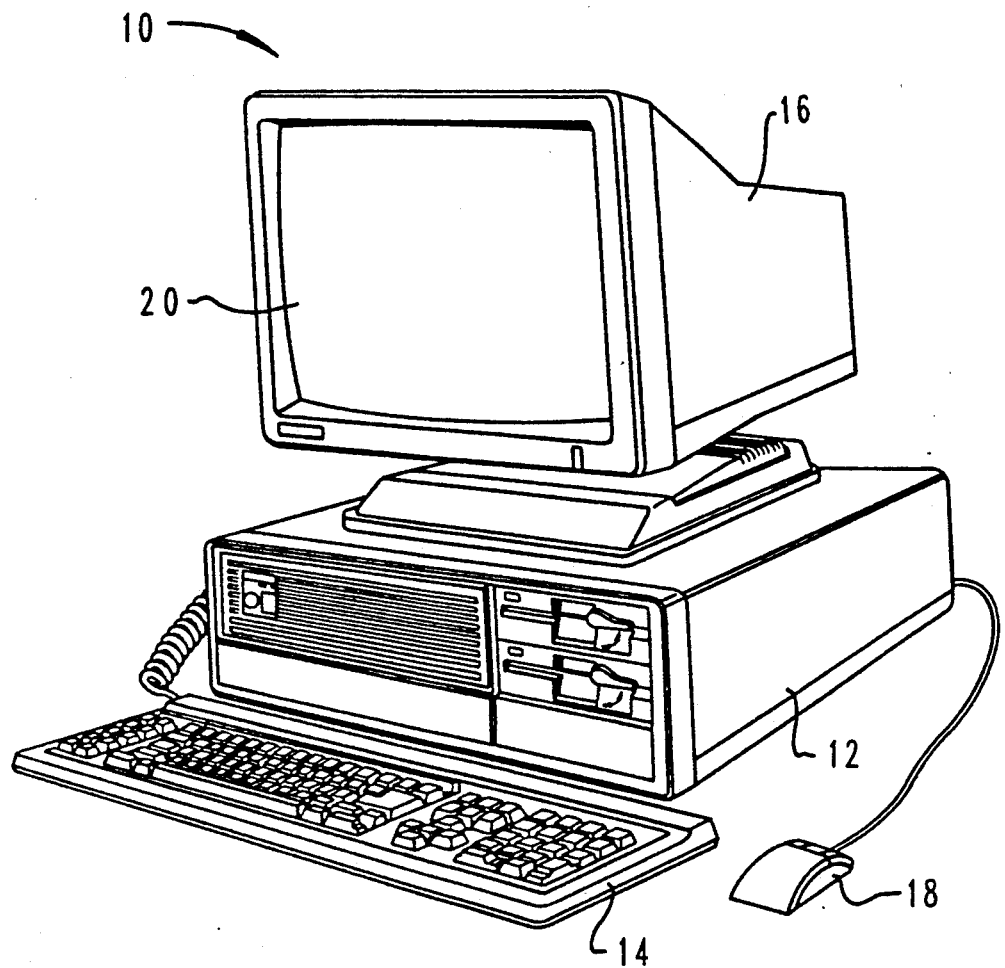
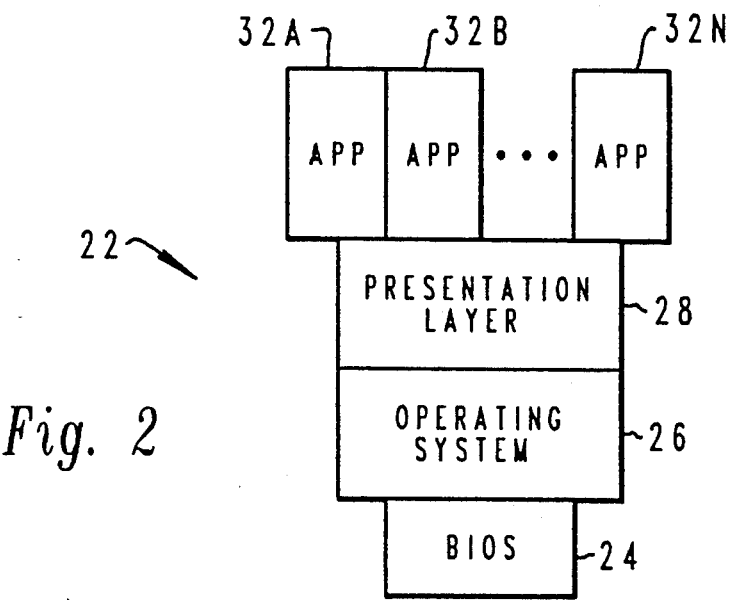
Fig. 2

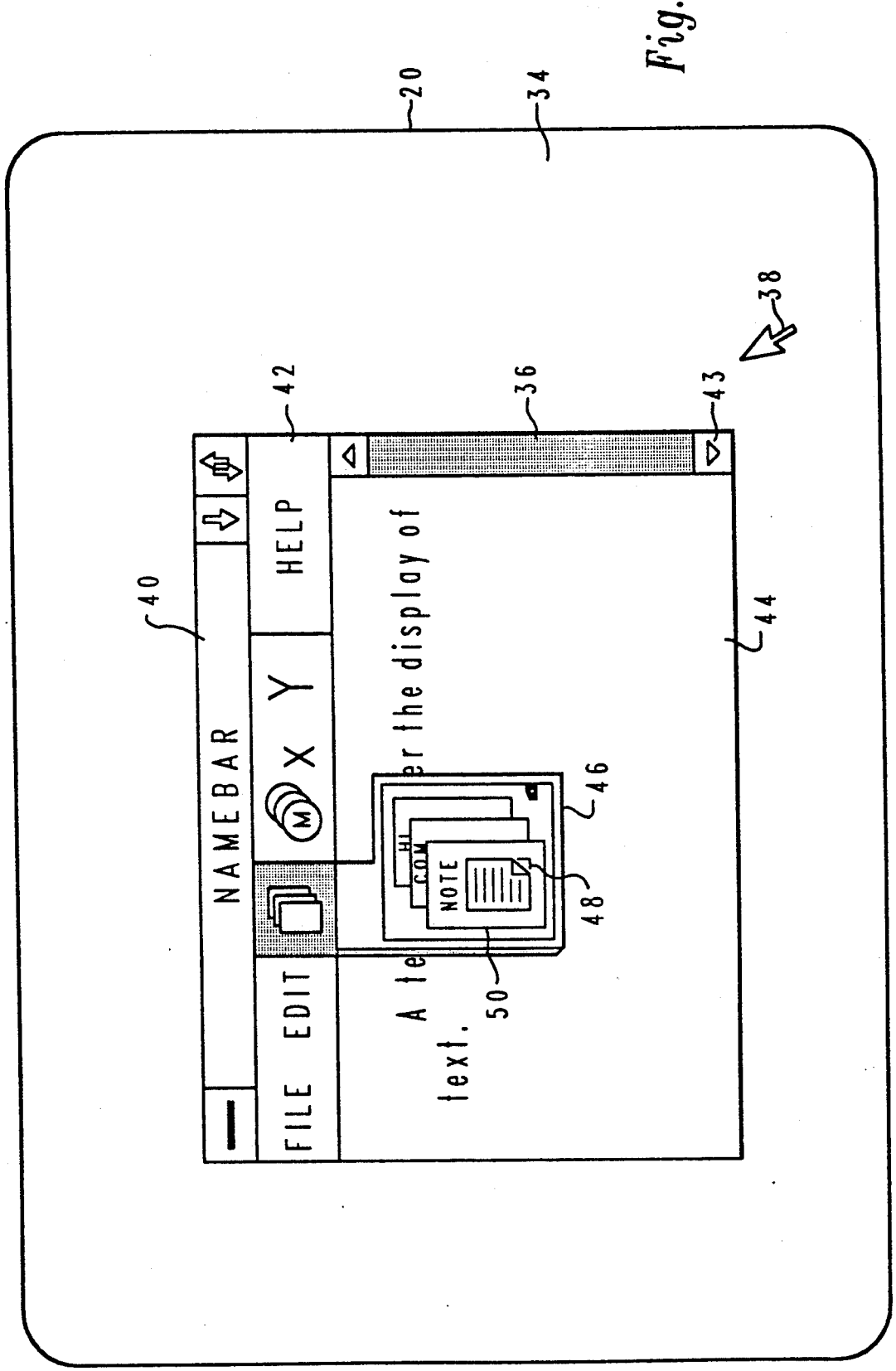

STATUS

ICON RING UNSELECTED
NO OPTIONS SELECTED

ICON RING SELECTED
NO OPTIONS SELECTED

ICON RING SELECTED
ONE OPTION SELECTED

ICON RING SELECTED
TWO OPTIONS SELECTED

ICON RING UNSELECTED
TWO OPTIONS SELECTED

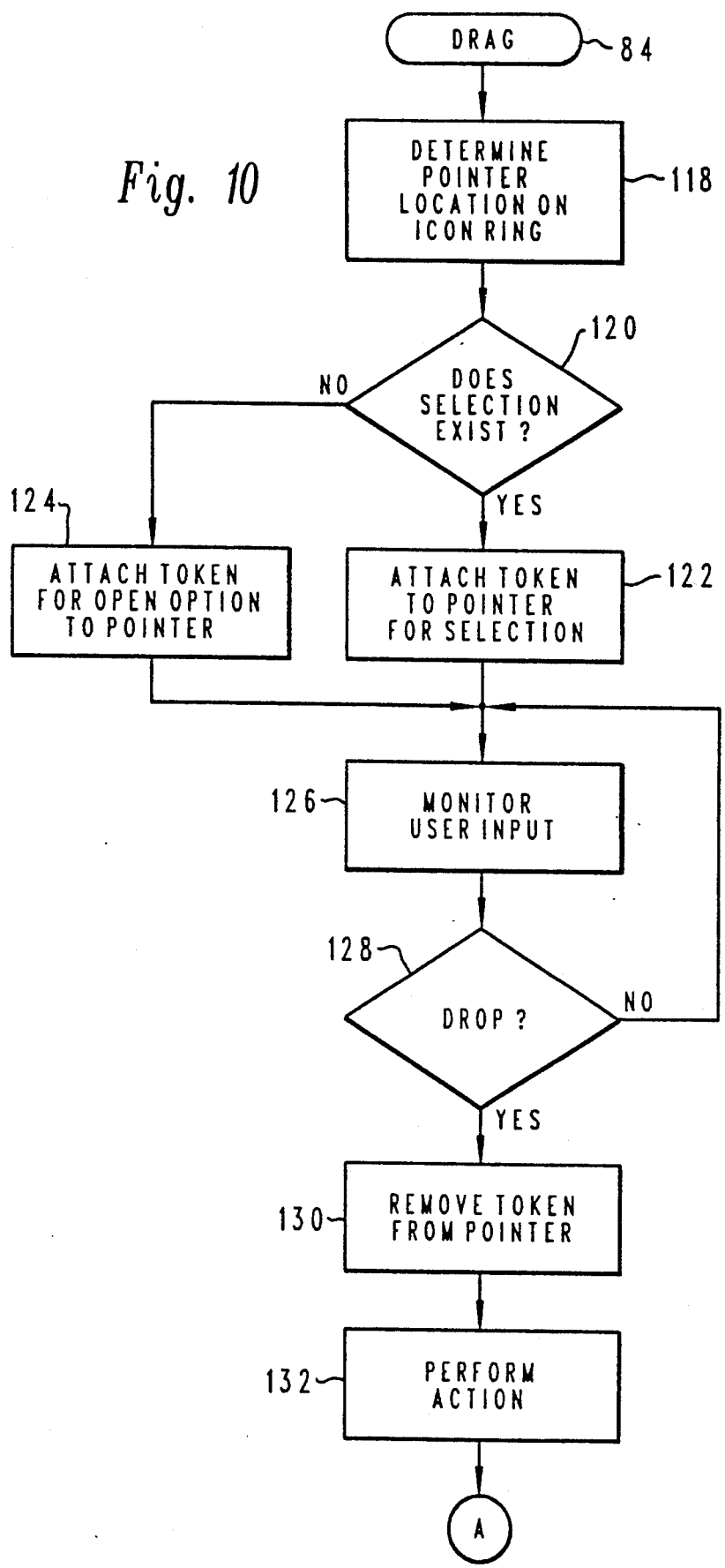

METHOD OF REPRESENTING A SET OF COMPUTER MENU SELECTIONS IN A SINGLE GRAPHICAL METAPHOR

This is a continuation of application Ser. No. 07/783,641, filed Oct. 28, 1991, now abandoned.

BACKGROUND OF THE INVENTION

1. Field of the Invention

The invention relates in general to a method for representing a group of menu items for a data processing system in a single graphical metaphor and more particularly, methods for enhancing access by an operator of the data processing system to each menu item available for selection. Still more particularly, the invention relates to a method for identifying a group of objects within a group, defining and ordering of that group, and displaying on a video display device a visual metaphor for an arrangement of items, indicating that the metaphor does not represent a single object.

2. Description of the Prior Art

The utility of personal computers has been enhanced in recent years through the use of graphical metaphors to represent menu selections on the computer. Graphical metaphors are graphic constructs imaged on a computer display screen. The metaphors are images of things of common use with a relation to an action to be performed, to an object, or to the characteristics of an object defined on the computer. For example, a trash can image might be used to represent a program for deleting files. A stack of sheets of paper might be a metaphor indicating occurrence of a word processing document. Where an operator moves (or drags) the graphical metaphor of the document to the image of the trash can and then selects the trash can, the operator deletes the document. In effect the operator has constructed the equivalent of an operating system command to delete a file. Graphical metaphors, or "icons" as they are commonly called, are to be viewed and manipulated in manners analogous to the physical objects which they emulate.

Icons are generated by graphical user interfaces (G.U.I.). A graphical user interface provides direct manipulation mechanisms for handling icons, graphics for the construction of icons and windows which divide a display screen into areas in which programs executing concurrently can each display information. Application programs interact with the graphical user interface to display information in a common format. A segment of the window can be a name bar which will include icons used for the manipulation of the window. Another defined space in most windows is the menu bar, where required for an application program.

In most window applications, highlighting an item from the menu bar results in generation of what is known as a pull-down menu. Where a large number of objects are part of the menu, the pull-down window or menu can be quite large. The sheer size of the pull-down menu may subtract from its convenience and result in an operator missing potential options from the list. Frequently, options are still expressed in highly abstract or arbitrary form. The menu items might be listed in strings of arbitrary letters and numbers having no clear or conventional meaning.

SUMMARY OF THE INVENTION

It is therefore one object of the present invention to represent a group of menu items in terms of a single graphical metaphor for that group.

It is another object of the invention to provide a method for enhancing access by an operator to each of a plurality of menu items.

It is still another object of the present invention to enhance access by an operator to a plurality of items in a menu by providing an icon evocative of an arrangement of items and permitting direct manipulation techniques for rearrangement of the group and selection of particular items from the group.

The foregoing objects are achieved as is now described. A data processing system includes an operating system, a graphical user interface and a plurality of applications programs. The graphical user interface generates a window relating to an executing application program. Menu items relating to an application program may be represented by an icon. A selected group of objects is defined over a portion of the menu and represented by a metaphor. The graphic metaphor, here an icon ring, is displayed on a display device. The icon ring is evocative of an ordered arrangement of items of the selected group, includes the icon for a particular object open to selection, and is subject to direct manipulation for reordering of the underlying selected group.

The above as well as additional objects, features, and advantages of the invention will become apparent in the following detailed description.

BRIEF DESCRIPTION OF THE DRAWINGS

The novel features believed characteristic of the invention are set forth in the appended claims. The invention itself however, as well as a preferred mode of use, further objects and advantages thereof, will best be understood with reference to the following detailed description of an illustrative embodiment when read in conjunction with the accompanying drawings, wherein:

FIG. 1 is a pictorial representation of a personal computer system;

FIG. 2 is a diagrammatic representation of software organization employed by the personal computer system of FIG. 1;

FIG. 3 is a pictorial representation of a display screen including a first opened window;

FIG. 10 is a logic flowchart illustrating program execution on a data processing system of the method of the present invention.

DETAILED DESCRIPTION OF THE INVENTION

Figure 4A:
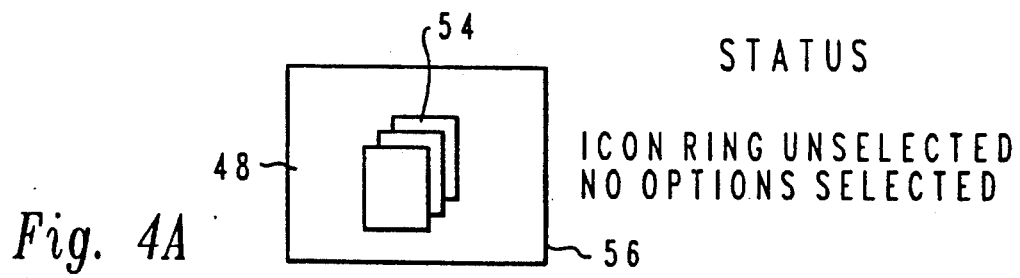
FIGS. 4a-4e are pictorial representations of various icon ring metaphors for arrangements and selections for a group of objects.

FIG. 1 depicts a pictorial representation of a personal computer system 10 which may be utilized in practicing the present invention. Computer system 10 is preferably provided by utilizing an IBM PS/2 personal computer 12 or other similar system. Personal computer system 10 generally includes a keyboard 14, a video display device 16 and a mouse 18. Keyboard 14, video display device 16 and mouse 18 are utilized by an operator to provide inputs to personal computer system 10 and to provide user discernible messages to the operator. Such messages are displayed on video display screen 20 of video device 16. Keyboard 14, video display device 16 and mouse 18 provide the physically manipulable portions of the interface between personal computer system 10 and the human user.

FIG. 2 is a diagrammatic representation of software organization 22 employed in the personal computer system 10 of FIG. 1. A basic input/output system (BIOS) 24 relates to controlling basic hardware operations of the computer, particularly the transfer of programs, including the operating system, from peripheral storage devices such as a hard disk drive to addressable computer memory. Upon an operator turning on computer 12, BIOS 24 controls a transfer of an operating system 26 from peripheral memory to addressable memory. A preferred operating system for practicing the present invention is the OS/2 operating system available from International Business Machines Corporation. The operating system of any personal computer controls the execution of application programs 32a-32n. A presentation layer 28 lies on top of the operating system 26 and beneath the application program 32a-32n. Presentation layer 28 is preferably provided by the Presentation Manager TM system available from International Business Machines Corporation. Presentation layer 28 provides a common syntax for application programs. Presentation layer 28 provides such interface elements as windows, icons, and graphing capabilities. Presentation layer 28 is available to all application programs 32a-32n. Application programs 32a-32n provide document processing, (i.e. word processing) spreadsheets, games, database manager and such other utilities as desired by the operator.

FIG. 3 is a pictorial representation of a display image 34 appearing on the display screen 20. Display image 34 includes an opened window 36 and a mouse pointer 38 for selecting and manipulating control elements of window 36. Control elements appear in both name bar 40, menu bar 42 and scroll bar 43. Below menu bar 42 is a text field 44 in which appears a pull-down window 46 which is associated with a menu bar item. Within pull-down window 46 is an icon ring 48. Icon ring 48 is a visual metaphor for a plurality of selectable items relating to the menu item appearing in menu bar 42.

Icon ring 48 is imaged as an arrangement of items stacked on one another. The top item of the stack is an icon 50 for the current submenu option opened for selection. Icon ring 48 is subject to various techniques of direct manipulation using mouse pointer 38. While direct manipulation techniques are known from the prior art, the specific application here allows manipulation of the arrangement of items to peruse the available options and to move each option into the top position of icon ring 48 for possible selection.

In essence an operator can examine icons for particular menu items in a sequential fashion through appropriate use of mouse 18. As icons are moved from the top of the stack they are replaced in the stack at the bottom with all other items moving up. Icon 50 changes with each replacement of the topmost object by imaging the icon for the newly selectable object at the top of the stack. The term "menu" is used in its broadest sense in this patent, that is as "a displayed list of objects from which a computer user can made a selection or otherwise make inputs." By way of example, an icon ring 48 may relate to a group of fonts available for selection. Alternatively, an icon ring 48 may relate to a group of input fields which may be accessed.

Icon ring 48 is also altered with selection of one or more options from the submenu represented by icon ring 48. FIG. 4a depicts a situation where no options have been selected. Icon ring 48 includes a stack or arrangement of items 54 surrounded by a selection indication border 56. None of items from stack 54 nor the selection border 56 are highlighted indicating no items have been selected.

Figure 4B:
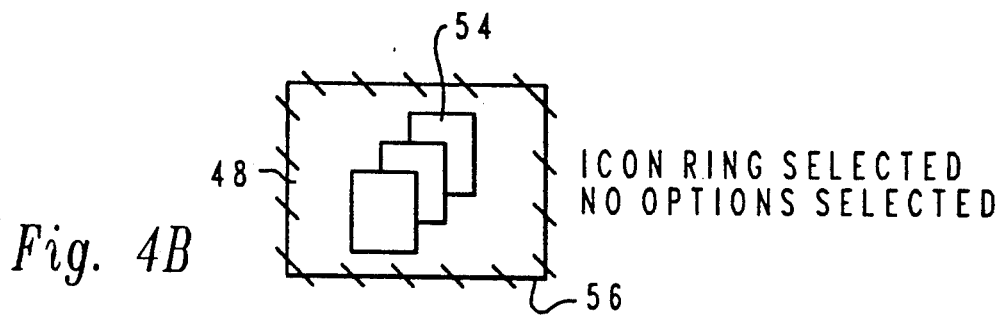

FIG. 4b depicts the situation where icon ring 48 has been selected. The ring boundary bar 56 has been highlighted, while stack 54 remains unchanged. Selection of icon ring 48 opens stack 54 to manipulation.

Figure 4C:
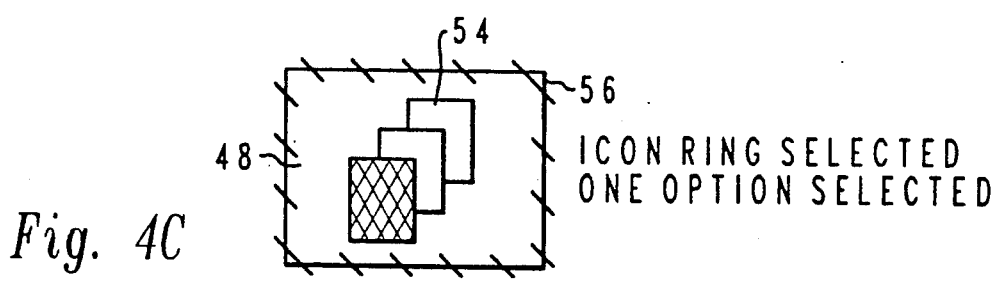

FIG. 4c depicts in pictorial form a situation where icon ring 48 is selected and one option from stack 54 has been selected. Boundary 56 remains highlighted and one item from stack 54, represented by the icon on top of the stack, is highlighted to indicate selection of the item.

Figure 4D:
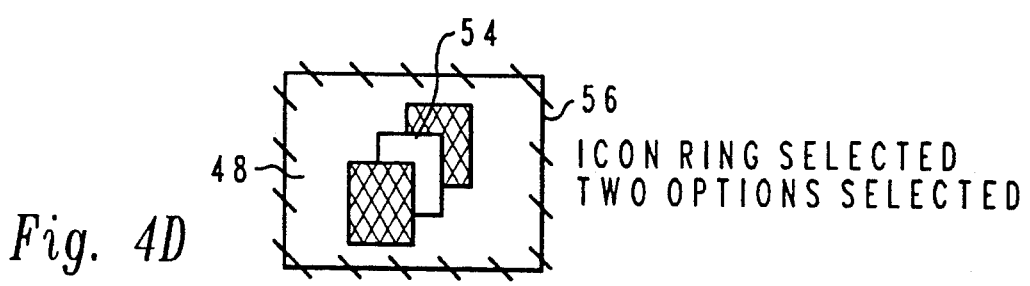

A selected item need not be the item on top of stack 54. FIG. 4d depicts a situation where two options have been selected while the icon ring itself remains selected. Highlighting of items within stack 54 and boundary 56 indicates this status.

Figure 4E:
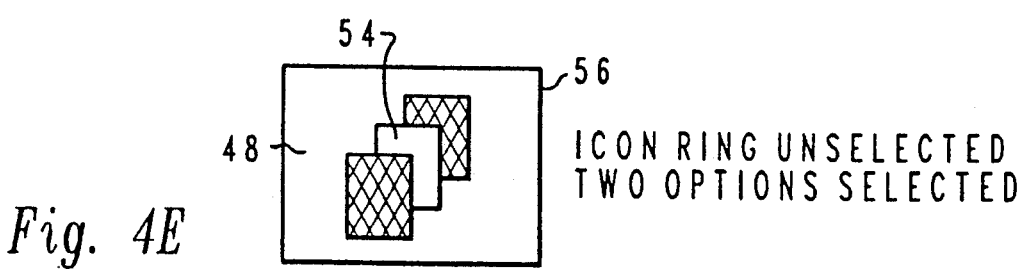

In FIG. 4e icon ring 48 has been deselected as indicated by the removing of highlighting from boundary 56. No change in the status of items within stack 54 has been made from FIG. 4d and accordingly selected options remain highlighted.

Referring now to FIGS. 5-10, there are depicted logic flowcharts illustrating icon ring presentation and manipulation methods of the present invention. The process begins at start block 60 indicating a power up situation on a personal computer. Next, at operation block 62, the data processing system is initialized. Initialization includes transfer of an operating system and presentation layer from peripheral memory to addressable memory within computer system 10. Next, at block 64, selected windows, icons and applications are opened indicating their display for selection on the video display device 16. Next, at block 66, the computer renders a hold to monitor for user inputs through keyboard 14 or manipulation of mouse 18.

Upon receipt of a user input, computer 12 undertakes analysis to determine the nature of that selection. At block 68, the computer determines if an icon ring has been selected. The YES decision branch from block 68 directs execution to a SELECT routine through block 70. The NO decision branch from block 68 advances execution to a decision block 72 which relates to manipulation of an icon ring. If selection within a ring is to be advanced, the YES branch from decision block 72 is followed to the ADVANCE routine indicated at block 74. The NO branch from decision block 72 advances execution to decision block 76. At block 76 is determined whether a menu item has been selected from the icon ring. The YES branch advances to option block 78 for execution of an OPTION routine. The NO decision branch advances execution to decision block 80 which determines whether a second selection has been made from the menu. The YES decision branch advances execution to a MULTIPLE SELECTION routine indicated at block 82. The NO decision branch advances execution to decision block 82. Decision block 82 relates to use of certain direct manipulation techniques provided by the presentation layer. At block 82 it is determined whether the user wishes to move the icon ring. A YES branch from decision block 82 moves execution to a DRAG subroutine 84 while a NO decision branch returns program execution to a monitor status by way of the other operations block 86.

Figure 5:
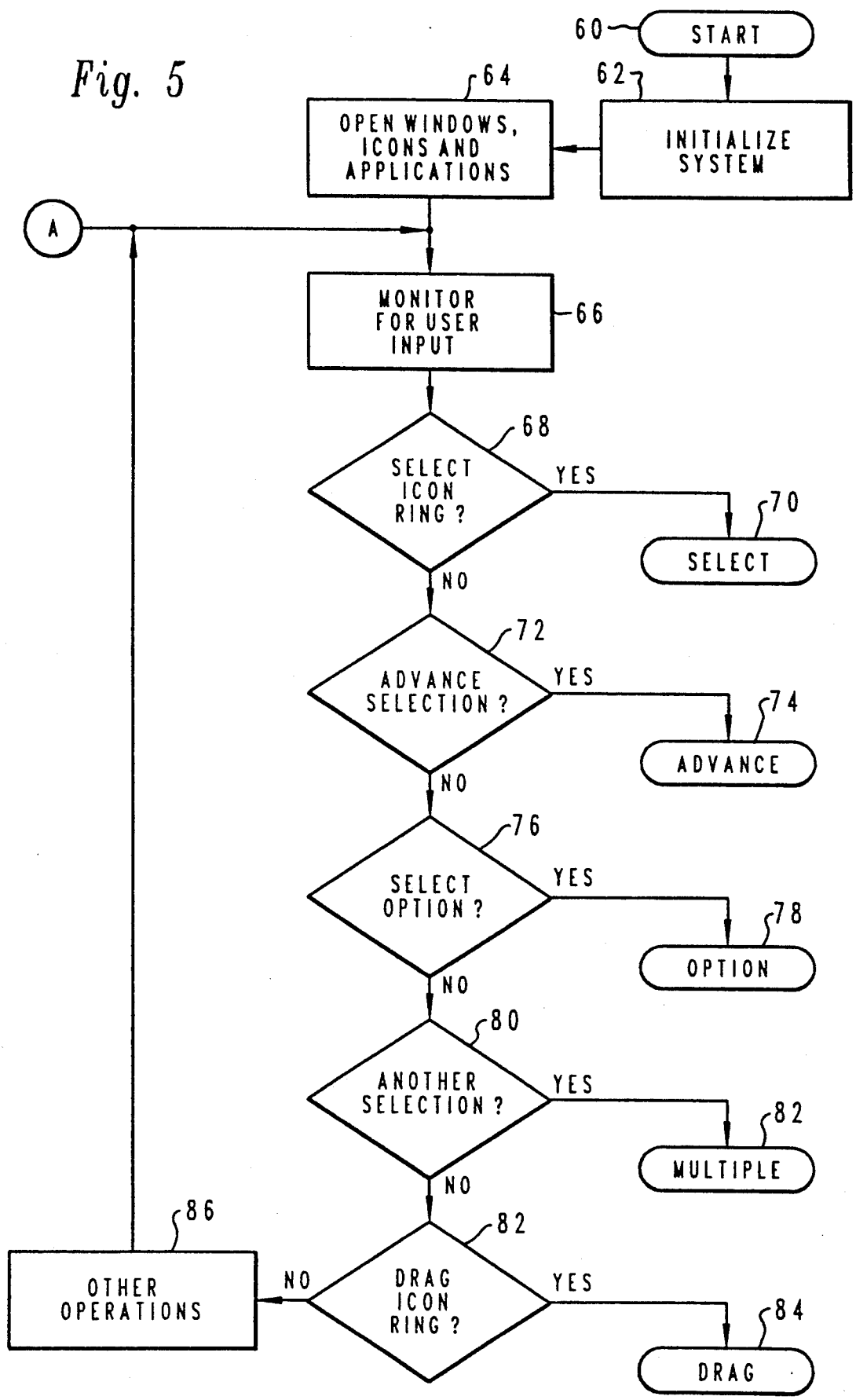
FIG. 5 is a logic flowchart illustrating program execution on a data processing system of the method of the present invention.
Figure 6:
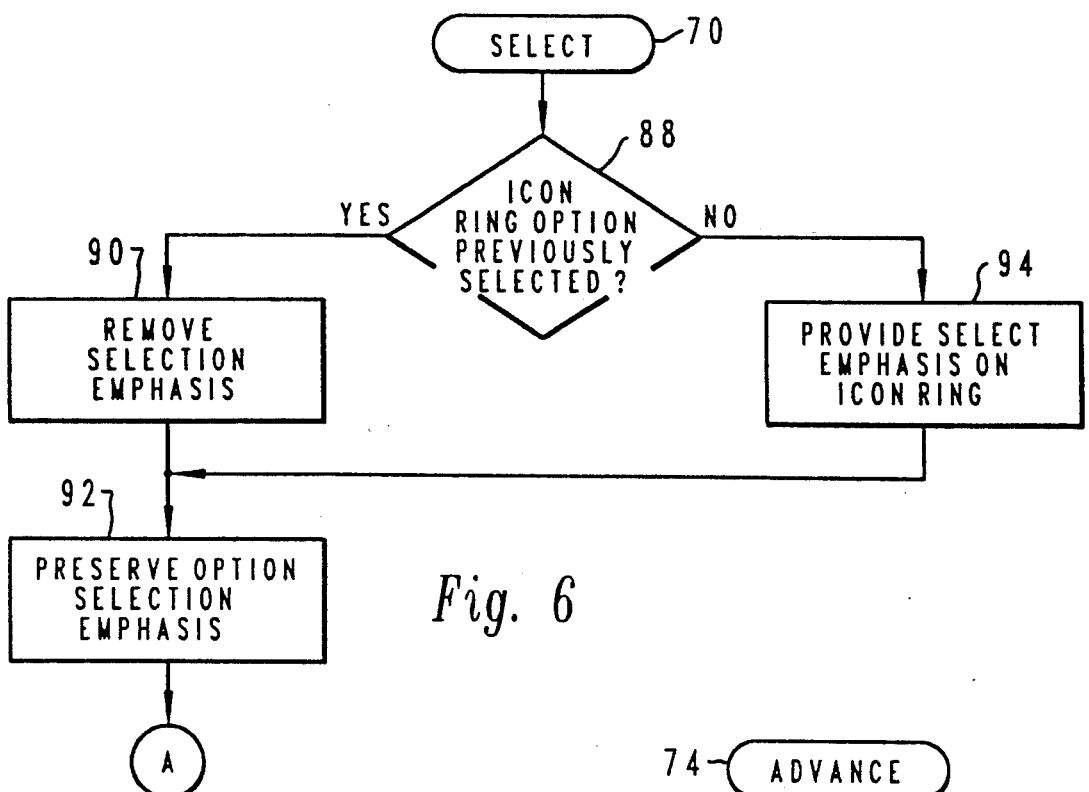
FIG. 6 is a logic flowchart illustrating program execution on a data processing system of the method of the present invention.

The various subroutines are accessed from the main routine of FIG. 5. In each of the figures a circle containing the letter A indicates the route by which execution returns to the main program of FIG. 5.

SELECT routine 70 relates to the opening and closing an icon ring for manipulation. This is depicted visually to the user by the highlighting of a boundary surrounding the stack of items. At block 88 it is determined if the icon ring has been selected. The YES branch of decision block 88 is taken if the icon ring was already open. Selection emphasis on the ring is removed at block 90 and all options highlighted within the stack are preserved at block 92. Program execution is the returned to the main program in FIG. 5. The NO branch from decision block 88 advances execution to block 94, where emphasis is added to the boundary around the stack in the icon ring. Next all options retain emphasis that they might have had upon entry to the ring at block 92. Again operation is returned to the main program from block 92.

Figure 7:
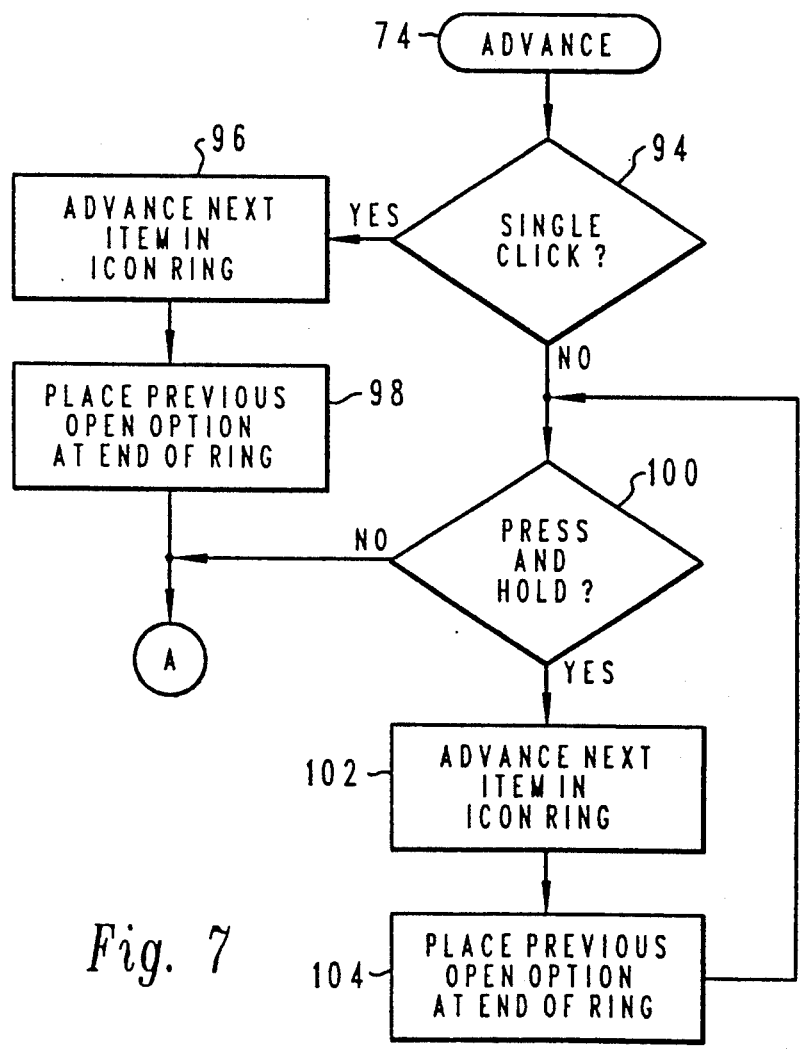
FIG. 7 is a logic flowchart illustrating program execution on a data processing system of the method of the present invention.

FIG. 7 illustrates manipulation of the arrangement of elements within a icon ring stack. Execution begins at advance block 74 and proceeds to decision block 94 where the character of the operator input is examined. The example given here is for use of a mouse for manipulation of the icon ring. At decision block 94 is determined whether the operator has made a quick depression and release of a selection button on the mouse with the mouse pointer adjacent to the image of the icon ring. Execution advances along the YES branch from decision block 94 to operation blocks 96 and 98 which operate on the icon ring stack to remove the top, opened item from the stack to the bottom of the stack and to advance the following item to the open or select position on top of the stack. Program execution is returned to the main program at letter A. The NO branch from decision block 94 advances to the press and hold determination of decision block 100. The YES branch from decision block 100 advances execution to operation blocks 102 and 104 which initiate a cycle through all items in the stack by repeated return of operation to the press and hold decision block 100. In other words, as long as the mouse select button is held down, the stack of items for selection is scrolled. The NO decision branch from the press and hold decision block returns operation of the program to the main program at letter A.

Figure 8:
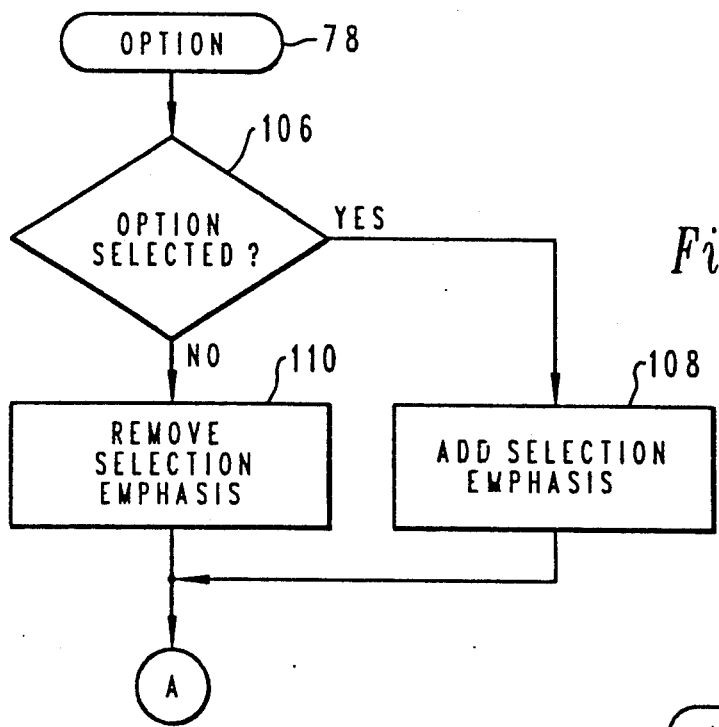
FIG. 8 is a logic flowchart illustrating program execution on a data processing system of the method of the present invention.

FIG. 8 illustrates selection of an option from among the items in an icon ring stack. From block 78, execution advances to decision block 106 where it is determined if the option has previously been selected. If the option has not been previously selected it is assumed the operator now intends to select it and the YES branch is followed from decision block 106. Selection emphasis for the icon for the option is then added at block 108 and the program is returned to the main program through letter A. If the option had already been highlighted as selected, it is assumed the operator now wishes to deselect the option and the NO branch from decision block 106 is followed. At block 110 selection emphasis is removed from the option and the item is deselected. Execution then returns to the main program through letter A.

Figure 9:
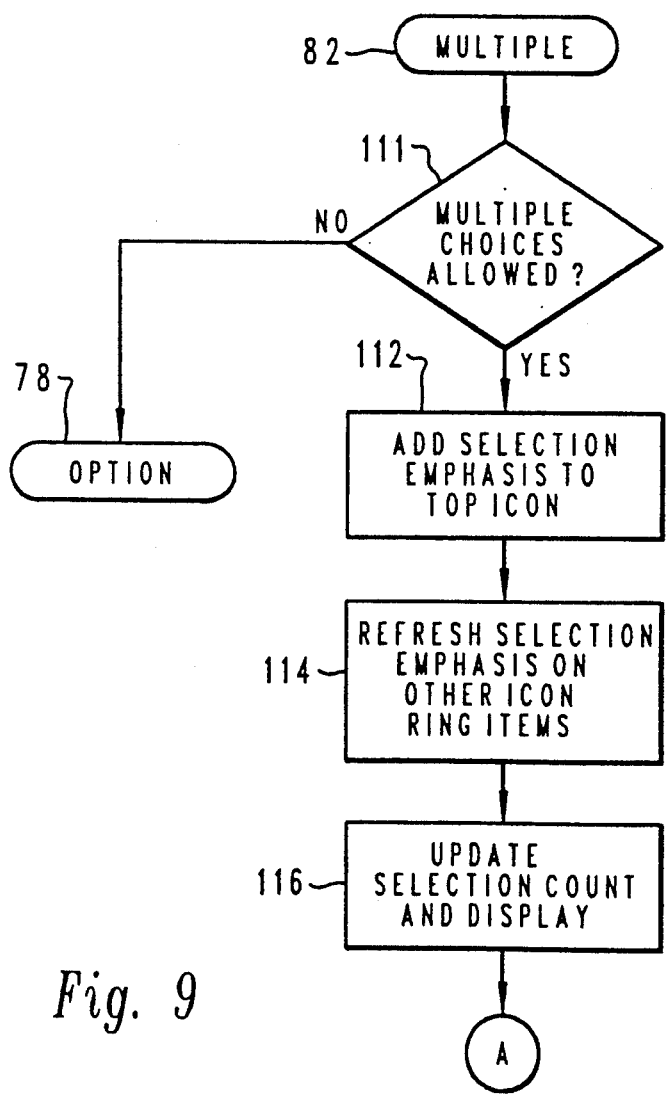
FIG. 9 is a logic flowchart illustrating program execution on a data processing system of the method of the present invention.

FIG. 9 depicts a logical flow diagram relating to execution of the program upon selection of a second or other multiple option from the menu. From block 82, decision block 111 is executed to determine whether multiple selections are permitted. If not, the OPTION subroutine is executed through block 78. If multiple selections are permitted, block 112 is next executed to add selection emphasis to the top icon of an icon ring stack. Next, at block 114, the selection emphasis on all other icon ring items is refreshed. Next, at block 116, the entire display is updated for imaging on a video display device and program execution is returned to in program through letter A.

FIG. 10 relates to the drag option, i.e., the direct manipulation of items of an icon ring. From entry into the drag routine at block 84, operation of block 118 follows. At block 118, it is determined whether pointer location is on the icon ring. Next, at block 120, it is determined if a selection exists. Along the YES branch from decision block 120 the item or token for the selected item is attached to the mouse pointer. At this point, the user or operator may move the token around on a video display screen. Along the NO branch from decision block 120, an open, i.e. nonselected option token is attached to the pointer for movement across the screen at block 124. Operation from blocks 122 and 124 merge then at block 126 for monitoring of further user inputs. User inputs could include movement, as already described, as well as the drop option which relates to detaching a token for an item from the mouse pointer. Until the drop option is selected, user inputs will simply result in a continued cycling of the program through blocks 126 and decision block 128. Block 128 relates to determination of the drop selection having been made. The YES branch from block 128 advances execution to block 130 where a token is removed from the pointer and from there to block 132 relating to performance of some action resulting from the new position of the token for the item. From block 132 execution is returned to the main program through letter A.

For a large number of choices in a selection list, the present invention can avoid requiring a designer segmenting data into hierarchical chains. Users or operators to the system will not require extra time to learn the structures of these chains preserving ease of use of the underlying window system.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A method of executing a graphical user interface to enhance display and manipulation through icons of objects in a menu on a data processing system which supports direct manipulation of icons, the method comprising the steps executed by the data processing system of:

associating icons with each of a plurality of objects from a menu;

displaying, on a video display device, an ordered arrangement of the icons, including an icon for a first object available for selection;

upon user selection of the ordered arrangement, visually marking the ordered arrangement and enabling direct manipulation of the ordered arrangement by the user;

responsive to user command, scrolling the icons in the ordered arrangement of the icons to present an icon for a second object available for selection;

upon user selection on a presented icon, providing visual emphasis for the presented icon; and upon user deselection of the ordered arrangement, removing visual marking from the ordered arrangement while leaving the visual emphasis on any icon then having visual emphasis.

2. A method as set forth in claim 1, and further comprising the steps of:

upon user deselection of an object, removing the visual emphasis from an icon for the object.

3. A method as set forth in claim 2, and further comprising the steps of:

responsive to user direct manipulation, dragging the ordered arrangement to a new position on the display device.

4. A method as set forth in claim 2, and further comprising the steps of;

allowing concurrent selection on the first and second objects; and visually marking the icons for all selected objects.

5. Apparatus for generating a graphical user interface for the display and manipulation through icon of objects from a menu on a data processing system, comprising:

means for directly manipulating icons;

icons for each of a plurality of objects from a menu;

a video display device for imaging an ordered arrangement of the icons, including an icon for a first object available for selection;

means responsive to user selection of the ordered arrangement for applying visual emphasis to the ordered arrangement and enabling direct manipulation of the ordered arrangement by the user;

means responsive to user command for scrolling the ordered arrangement of the icons to present an icon for a second object available for selection;

means responsive to user selection on a presented icon for providing visual emphasis of the presented icon; and means responsive to user deselection of the ordered arrangement for removing visual marking the ordered arrangement without removing the visual emphasis on any icon.

6. Apparatus as set forth in claim 5, and further comprising:

means responsive to user deselection of a previously selected icon for removing the visual emphasis for the icon.

7. Apparatus as set forth in claim 6, and further comprising:

means responsive to user direct manipulation for dragging the ordered arrangement to a new position on the display device.

8. Apparatus as set forth in claim 7, and further comprising:

means for allowing concurrent selection on the first and second objects; and means for visually marking the icons for all selected objects.

* * * * *